C. B. KIRKHAM.
PROPELLER HUB FASTENING.
APPLICATION FILED MAR. 22, 1917.
1,437,471.
Patented Dec. 5, 1922.
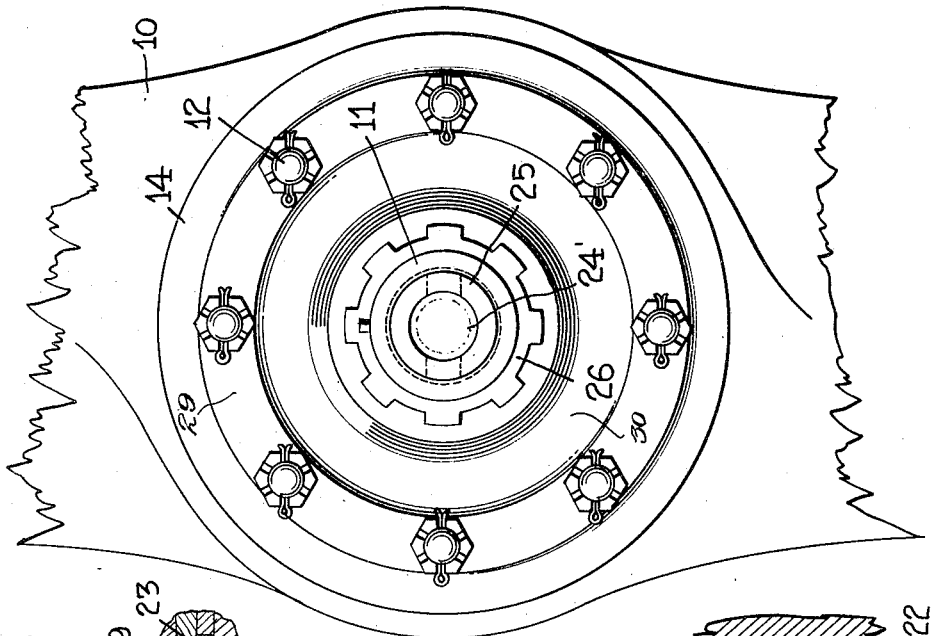
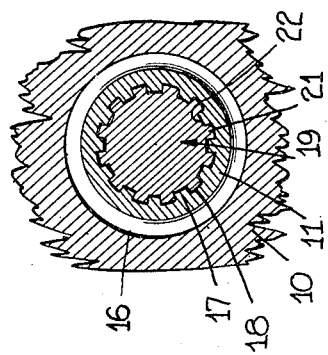
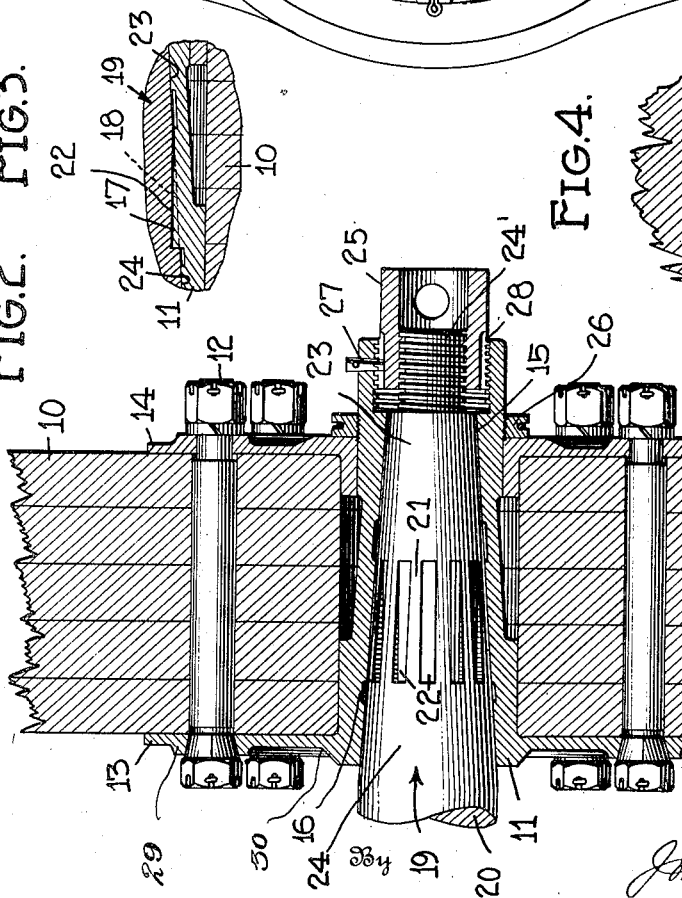
Inventor
CHARLES B. KIRKHAM.
By John P. Tarbox
Attorney Patented Dec. 5, 1922.

1,437,471

UNITED STATES PATENT OFFICE.

CHARLES B. KIRKHAM, OF BUFFALO, NEW YORK, ASSIGNOR TO CURTISS AEROPLANE AND MOTOR CORPORATION, A CORPORATION OF NEW YORK.

PROPELLER-HUB FASTENING.

Application filed March 22, 1917. Serial No. 156,623.

*To all whom it may concern:*

Be it known that I, CHARLES B. KIRKHAM, a citizen of the United States, residing at Buffalo, in the county of Erie and State of New York, have invented certain new and useful Improvements in Propeller-Hub Fastenings, of which the following is a specification.

This invention relates to hub bearings for propellers of aircraft and is characterized by the introduction of a novel method of fastening the propeller hub rigidly in place and against both axial and circumferential displacement with respect to the stub terminal of the driving or propeller shaft.

At present it is customary in aeroplane construction to provide the hub sleeve as well as the terminal stub of the driving shaft with a longitudinal taper which is extended the full length of the stub sleeve in order that the propeller hub and consequently the propeller may be maintained in alignment with respect to the driving shaft. A driving connection is obtained by means of keyways and complemental longitudinally extending keys. The inner and enlarged portion of the stub terminal constitutes the driving section and the outer tapered portion the aligning section. Although serviceable, such a hub construction is objectionable by reason of the fact that burrs and similar irregularities are often formed in the cutting of the keyways and a true lining up of the hub sleeve prevented. Moreover, an uneven driving torque is set up by reason of a symmetrical arrangement of the driving keys and aligning contact at the inner end of the stub terminal is prevented.

The characteristic of this invention is to do away with the aforementioned objectionable features and instead provide a uniformly tapered shaft end or stub grooved at its center portion only to form a plurality of complemental keys and keyways on the shaft and in the hub respectively, the milling being done parallel to the axis of the shaft and in such fashion that the depths of the keys and keyways taper. The section of the hub contained in the keyways is enlarged in diameter whereby there is no contact of the tapered bearing surface in the key or center section, but firm taper contact is made at the head and foot of the hub. This gives an absolutely rigid connection and effectually prevents precession of the propeller from its normal and proper plane of revolution and eliminates altogether even slight vibration in any plane of its axis due to irregularities of motor operation, motor starting and stopping.

The propeller improvement also includes a securing and removing member which is both interiorly and exteriorly threaded, interiorly to take the stud end of the driving shaft and exteriorly to take the interior threads of the hub. These threads are of different pitch (the interior of high and the exterior of low pitch) whereby an actual placement and displacement of the hub takes place as said member is threaded on the end of the shaft.

In describing my invention in detail, reference will be had to the accompanying drawings wherein similar reference characters denote like or corresponding parts throughout the several views, of which:

Fig. 1 is a face view of the hub section of an aeronautical propeller;

Fig. 2 is a sectional view of the hub section;

Fig. 3 is a fragmentary sectional view illustrating the key and keyway formation, and Fig. 4 is a cross section on the stub terminal and hub sleeve taken through the driving section of the hub.

The propeller, designated in its entirety by the numeral 10, at its hub section, is equipped with the usual hub sleeve 11 and hub fastening devices 12, the latter penetrating the hub section of the propeller and the face plates 13 and 14 which constitute with the hub sleeve 11 the propeller hub. The bore 15 of the hub sleeve 11 is tapered throughout and enlarged centrally as indicated at 16 to define what I shall hereinafter term the driving section of the sleeve. A plurality of grooved keys and keyways 17 and 18 respectively are formed upon the center or driving section of the sleeve to extend longitudinally throughout the greater portion of the length of said section, both the keys and keyways tapering in depth.

A substantially complemental stub terminal 19 is formed upon the extremity of the driving shaft herein designated 20. Intermediate its ends this stub terminal is equipped with a plurality of keys and keyways 21 and 22 respectively, the keys 21 engaging snugly in the keyways 18 of the hub sleeve and the keys 17 of the hub sleeve engaging snugly in the keyways 22 of the stub. Like the keys and keyways of the hub sleeve, the complemental keys and keyways of the stub are of varying or tapering depth. In each instance the milling is done respectively parallel to the axis of the shaft 20 and the sleeve 11.

That portion of the outer surface of the stub terminal 19 at the head and at the foot is smooth surfaced and longitudinally tapered to provide longitudinally separated aligning sections 23 and 24, the former firmly contacting the corresponding inner surface of the sleeve 11 at one end and the latter correspondingly contacting the complemental inner surface of said sleeve at its opposite end. There is thus evolved a combined driving and aligning section in which the aligning section is interrupted by the formation of the driving section. This construction gives to the hub bearing an absolutely rigid connection and effectually prevents precession of the propeller from its normal and proper plane of revolution and at the same time eliminates absolutely even the slightest vibration in any plane of its axis.

Terminally, the stub 19 is provided with an exteriorly threaded stud 24' upon which is threaded a securing member or nut 25 both interiorly and exteriorly threaded, the interior threads engaging the stud 24' and the exterior threads the interiorly threaded terminal of the sleeve 11 (see Fig. 2). The threads of the securing member 25, in each instance, are of a different pitch, the exterior of low pitch and the interior of high pitch, whereby an actual placement and displacement of the hub is effected as the nut 25 is threaded on the end of the shaft. The hub sleeve 11 is also exteriorly threaded throughout a portion of its length for the reception of a nut 26 which is adapted to be threaded into abutting contact with the outer face plate 14 of the propeller hub. Moreover, pins 27 may be provided as a locking means for the nut 25, the pins engaging in apertures formed in the outer end of the sleeve 11 and in one of a plurality of longitudinally extending grooves 28 formed in the nut 25.

The face plates 13 and 14 are provided with thickened and strengthening portions near their peripheries, forming annular shoulders 29 of sufficient width to readily accommodate the openings for the bolts 12. These shoulders form substantial bearing surfaces for the bolt heads, while the portions of the face plates intermediate these shoulders and the sleeve 11 are reduced in thickness to form annular valleys 30. This construction has been found to combine strength and security with lightness in weight, characteristics especially desirable in a propeller hub construction.

The construction cost of a hub bearing thus formed is minimized in that the terminal stub can be first formed with a perfectly smooth outer surface and the keys and keyways thereafter grooved to parallel the axis of the shaft. By enlarging the diameter of the bore of the sleeve 11 at its driving or center section, aligning contact at said section is avoided without interfering with the firm tapered contact so necessary at the head and foot of the stub. Both circumferential and axial displacement of the hub with respect to the terminal stub is avoided. Furthermore, by reducing the diameter of the sleeve at its center section, only the side walls of the complemental keys and keyways abut.

While in the foregoing there has been illustrated in the drawings and described in the specification such combination and arrangement of elements as constitute the preferred construction or embodiment of this invention, it is nevertheless desired to emphasize the fact that interpretation of the invention should only be conclusive when made in the light of the subjoined claims.

What is claimed is:

1. A propeller hub bearing including a driving shaft having a uniformly tapered stub terminal, said tapered portion constituting an aligning section and being longitudinally interrupted by a driving section, said driving section being formed by grooving the tapered portion of the shaft to provide a plurality of keys and keyways.

2. A propeller hub bearing including a uniformly tapering driving element, said tapered portion of the driving element providing an aligning section, and said aligning section, intermediately of its ends, being longitudinally interrupted by the provision of a plurality of tapered keys and keyways which collectively provide a driving section, together with a driven element mounted on the tapered driving element, said driven element having an engaging surface substantially complemental to said driving element.

3. In a hub bearing for propellers, a hub sleeve having a central bore section of a diameter greater than the diameter of its bore at the extremities of said center section, said center section being longitudinally grooved to provide keys and keyways of tapering depth, and a driving element having a tapering stub terminal centrally grooved to provide keys and keyways substantially complemental to the keys and keyways of said sleeve, the terminal portions of said stub functioning as aligning sections which engage firmly with the corresponding terminal portions of said sleeve.

In testimony whereof I hereunto affix my signature.

CHARLES B. KIRKHAM.